J. P. CALNAN.
RAKE.
APPLICATION FILED SEPT. 14, 1917.
1,304,942.
Patented May 27, 1919.
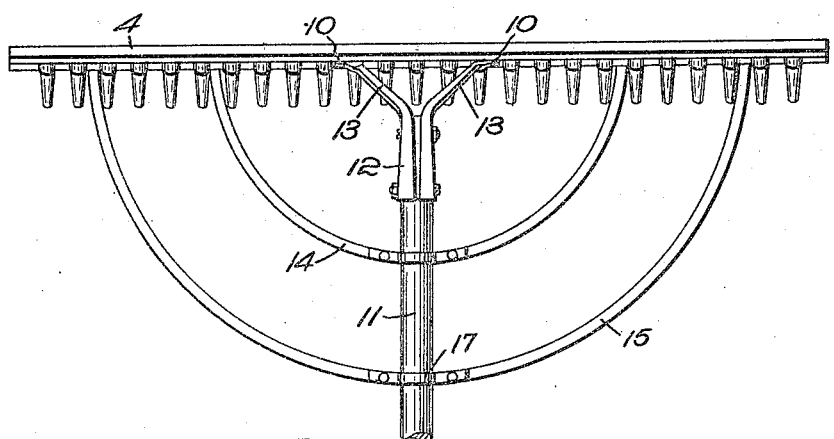
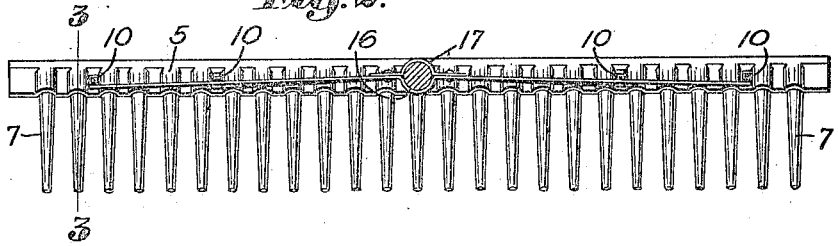
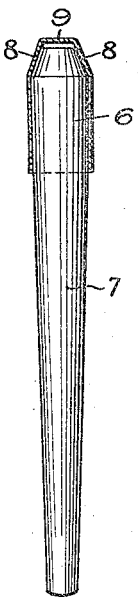
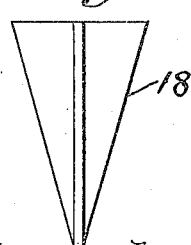
Inventor:
James P. Calnan,
by Emery, Booth, Janney & Varney
Attys.

UNITED STATES PATENT OFFICE.

JAMES P. CALNAN, OF SOUTHBORO, MASSACHUSETTS.

RAKE.

1,304,942.  Specification of Letters Patent.  Patented May 27, 1919.

Application filed September 14, 1917. Serial No. 191,335.

*To all whom it may concern:*

Be it known that I, JAMES P. CALNAN, a citizen of the United States, and a resident of Southboro, county of Worcester, and State of Massachusetts, have invented an Improvement in Rakes, of which the following description, in connection with the accompanying drawings, is a specification, like characters on the drawings representing like parts.

This invention pertains to improvements in rakes, more particularly, though not exclusively, to rakes having detachable teeth.

In the drawings:

Figure 1 is a plan view of a rake constituting one form of my invention;

Fig. 2 is a rear elevation thereof, partly in section;

Fig. 3 is a section on the line 3—3 of Fig. 2;

Figs. 4 and 5 show a side elevation and plan respectively of a preferred form of ferrule for protecting the tip of a wooden rake-tooth.

In the preferred form of my invention selected for illustrative purposes I have shown a rake-head 4 preferably as shown formed from sheet metal died to present tooth-engaging sockets 5, which are preferably as shown slightly tapered to engage the slightly tapered butts 6 of the teeth 7, thereby to prevent the teeth from falling out, and preferably coöperating with flattened surfaces 8 at the top of the tooth to prevent turning of the tooth in the sockets. The top of the metallic rake-head is preferably flat as shown to provide a straight-edged ferrule 9 for use in smoothing the ground or in surface hoeing by merely inverting the rake and using the back instead of the teeth. The rake-head is preferably provided with tension screws 10, which draw the opposite sides of the rake-head toward each other, thereby gripping the teeth 7. The rake-head is preferably of such gage metal that a comparatively small number of screws 10 will cause firm gripping of a considerably larger number of teeth by the rake-head, while permitting, on removal or loosening of any one of said screws, the removal of any desired adjacent rake-tooth.

The rake-head may be attached to its handle 11 by means of a ferrule 12, preferably split as shown, to grip the handle 11 and to provide strong and inexpensive engagement with the rake-head 4 by divergent arms 13.

The divergent arms 13 may be connected to the rake-head 4 by two of the screws 10. The arms 13 are preferably ribbed as shown in Fig. 1, the ribs terminating adjacent the rake head to permit bending of the ends of the arms in two dimensions to engage the rake head and to determine the angularity thereof relative to the handle.

To further strengthen the rake I preferably provide braces 14 and 15, preferably curved in plan and preferably bent at the ends and drilled for engagement by the screws 10. The braces 14 and 15 preferably engage the handle 11 by the curved portions 16 formed in said braces and coöperating with curved plates 17 riveted or otherwise secured to the braces 14 and 15, thereby to encircle the handle 11 and provide firm engagement therewith.

The teeth 7 are preferably circular in cross-section throughout substantially their entire length, the top portion only being flattened on opposite sides for engagement with the surfaces 8, 8.

I may, if desired, provide metallic tips 18 for the ends of the rake-teeth 7, such tips being preferably driven on to the taper of the rake-teeth, and being removable therefrom for replacement or for other reasons. The steel tip may be round in cross-section for road and avenue work, and of the form shown in Figs. 4 and 5 for work on garden or flower-beds. The tip shown in Figs. 4 and 5 is died from a flat plate, the metal being bent into the form shown so as to provide sharp edges for disintegrating the surface of the ground.

While I have shown and described one embodiment of my invention, it will be understood that such specific description does not limit my invention, but that considerable changes may be made within the scope of the following claims.

Claims:

1. In a rake, in combination, a tooth-supporting head formed of a single strip of material shaped so that opposite edges of said strip approximately meet, and formed with sockets wherein rake teeth are removably held, said strip of material having a flattened surface adjacent the top of said sockets; the rake teeth having a flattened surface at their upper extremities in lateral engagement with the flattened surface of said strip, said sockets gripping the teeth below said flattened surface, while said flattened surface prevents rotation of said teeth relative to said sockets.

2. A ferrule for engagement with the tip of a wooden rake tooth, formed of sheet metal and bent to provide a rake tooth engaging socket and a plurality of flanges projecting laterally therefrom.

3. A rake tooth having an intermediate tapered portion round in cross-section for engagement by a contractible socket of a rake head, and having an upper portion having two opposite sides beveled to prevent rotation of said tooth in said socket.

In testimony whereof I have signed my name to this specification.

JAMES P. CALNAN.

Copies of this patent may be obtained for five cents each, by addressing the "Commissioner of Patents, Washington, D. C."